United States Patent
Howell et al.

(10) Patent No.: US 6,297,947 B1
(45) Date of Patent: Oct. 2, 2001

(54) EXTERNAL HINGE FOR A PORTABLE COMPUTER COVER

(75) Inventors: Bryan F. Howell; Bryan K. Hunter, both of Austin, TX (US)

(73) Assignee: Dell USA, L.P., Round Rock, TX (US)

( * ) Notice: Subject to any disclaimer, the term of this patent is extended or adjusted under 35 U.S.C. 154(b) by 0 days.

(21) Appl. No.: 09/383,007

(22) Filed: Aug. 25, 1999

(51) Int. Cl.[7] ........................................... G06F 1/16
(52) U.S. Cl. ................ 361/683; 361/680; 361/681; 361/686; 248/917; 248/918; 248/919; 248/920; 248/921; 248/922; 248/923; 248/924
(58) Field of Search .................................. 361/680, 681, 361/683, 686; 248/917–924

(56) References Cited

U.S. PATENT DOCUMENTS

| | | |
|---|---|---|
| 5,245,559 | 9/1993 | Lapeyre . |
| 5,262,759 | * 11/1993 | Moriconi et al. ............... 345/30 |
| 5,335,142 | 8/1994 | Anderson . |
| 5,548,478 | 8/1996 | Kumar et al. . |
| 5,708,561 | 1/1998 | Huilgol et al. . |

* cited by examiner

*Primary Examiner*—Leo P. Picard
*Assistant Examiner*—Yean-Hsi Chang
(74) *Attorney, Agent, or Firm*—Haynes and Boone, L.L.P.

(57) ABSTRACT

A portable computer includes a base and a cover mounted to the base. The base has a first hinge groove formed in an external surface of the base, and the cover has a second hinge groove formed in an external surface of the cover. The portable computer also includes a hinge having a first portion and a second portion. The first portion is seated in the first hinge groove and is substantially flush with the external surface of the base adjacent the first hinge groove. The first portion is rigidly connected to the base. The second portion is seated in the second hinge groove and is substantially flush with the external surface of the cover adjacent the second hinge groove. The second portion is pivotally connected to the cover and rigidly connected to the first portion such that the second portion is substantially perpendicular to the first portion.

18 Claims, 3 Drawing Sheets

EXTERNAL HINGE FOR A PORTABLE COMPUTER COVER

BACKGROUND

The disclosures herein relate generally to portable computers and more particularly to an external hinge for mounting an LCD panel cover to a base of a portable notebook computer.

The desire for large screen displays in portable computers is recognized in U.S. Pat. No. 5,245,559 which discloses a programmable portable electronic computer including a twelve key keyboard array capable of entering a full range of alphanumeric characters and computer commands and a large area electronic display screen. This affords room for graphical presentations with alphanumeric notation, and enough rows of printed text to afford word processing capabilities. Thus, a tape recorder within the housing may include software and is coupled for use in dictating, storage, word processing and computer interfacing use, all under control of the keyboard keys.

There have been various attempts to address limitations associated with hinged couplings used in portable computers. U.S. Pat. No. 5,335,142 discloses a portable computer having a hinge assembly which allows the cover and display screen to be tilted from the base of the portable computer and then swivelled about a vertical axis. One hinge is provided at the rear edge of the base of the portable computer about which the cover both tilts and swivels. The hinge assembly includes stops which limit the amount of tilt and swivel.

In U.S. Pat. No. 5,548,478, a laptop style computing device includes a base portion, a display portion containing a display screen and a touch input panel, and a mechanism for selectively positioning the display portion in selective angular engagement with the base portion in a plurality of angular upright positions for use in the laptop mode, as well as the display up position for slate style use and the display down position for closing the device.

In U.S. Pat. No. 5,708,561, a portable computer includes a base and a cover incorporating a display screen pivotably mounted to the base between a closed position overlying the base and an open position raised over the base. A swivel arrangement is located in the cover enabling at least a portion of the cover and the display screen to be rotatable about an axis which is perpendicular to the cover in the open position, and between a landscape orientation in which the display screen has a longer dimension extending in a substantially horizontal direction, and a portrait orientation in which the display screen has a shorter dimension extending in a substantially horizontal direction. The cover is also mounted for sliding movement. Front speaker ports are opened and closed when the cover moves. A recessed corner segment is provided on the cover for easier manipulation of the cover.

The portable computer industry is providing notebook computers with larger and larger LCD displays to respond to user demand. New larger size LCD displays are being produced faster than the notebook chassis supply can respond. Typically an LCD panel is mounted in the cover of a notebook computer. The cover is mounted on a hinge or hinges for pivotable movement relative to the computer base. The hinge or clutch mechanism is mounted in the LCD panel cover directly below the LCD panel and within the same plane as the panel.

As a result, the placing of the hinges within the LCD panel cover restricts the amount of space available for the LCD panel within the dimensions of the cover. Therefore, there is no space available in the LCD panel cover for expansion to accommodate a larger size LCD panel.

Another problem is that only one size LCD panel cover can typically be mounted to a base of a particular size. Thus, typically a unique base must be manufactured to accommodate each new LCD panel cover of increasing size. It would be desirable to provide a portable computer having a base to which LCD panel covers having a variety of sizes could be mounted, including LCD panel covers having larger footprints than that of the base. It would also be desirable to provide a hinge that would allow the LCD panel cover mounted on a particular base to be easily interchanged.

Therefore, what is needed is a hinge which allows display panels of various sizes to be mounted to a portable computer base of a particular size and easily interchanged.

SUMMARY

One embodiment, accordingly, provides an external hinge which allows display panels having a variety of sizes to be mounted to a particular portable computer base and be easily interchanged. To this end, a portable computer includes a base and a cover mounted to the base. The base has a first hinge groove formed in an external surface of the base, and the cover has a second hinge groove formed in an external surface of the cover. The portable computer also includes a hinge having a first portion and a second portion. The first portion is seated in the first hinge groove and is substantially flush with the surface of the base adjacent the first hinge groove. The first portion is rigidly connected to the base. The second portion is seated in the second hinge groove and is substantially flush with the surface of the cover adjacent the second hinge groove. The second portion is pivotally connected to the cover and rigidly connected to the first portion such that the second portion and the first portion are substantially perpendicular.

A principal advantage of this embodiment is that in a portable computer, a variety of display panel covers having different sizes can be mounted to a particular portable computer base, including a display panel cover having a footprint which is larger than the footprint of the base. Another advantage is that a display panel cover can be easily mounted to a portable computer base, and easily interchanged with another cover, including a cover having a different size.

DETAILED DESCRIPTION

Figure 1:
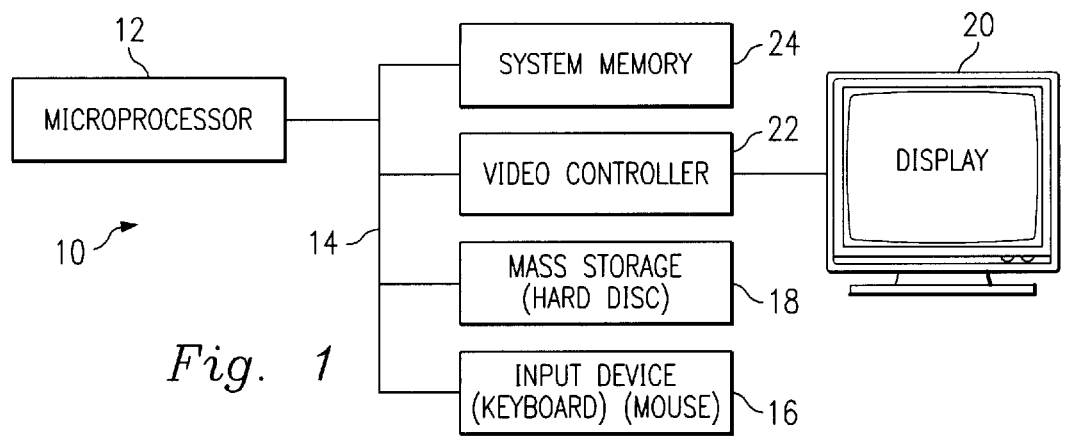
FIG. 1 is a diagrammatic view illustrating an embodiment of a computer system.

In one embodiment, as shown in FIG. 1, computer system 10 includes a microprocessor 12, which is connected to a bus 14. Bus 14 serves as a connection between microprocessor 12 and other components of computer system 10. An input system 16 is coupled to microprocessor 12 to provide input to microprocessor 12. Examples of input devices include keyboards, touchscreens, and pointing devices such as mouses, trackballs and trackpads. Programs and data are stored on a mass storage device 18, which is coupled to microprocessor 12. Mass storage devices include such devices as hard disks, optical disks, magneto-optical drives, floppy drives and the like. Computer system 10 further includes a display 20, which is coupled to microprocessor 12 by a video controller 22. A system memory 24 is coupled to microprocessor 12 to provide the microprocessor with a fast storage to facilitate execution of computer programs by microprocessor 12. It should be understood that the other busses and intermediate circuits can be deployed between the components described above and microprocessor 12 to facilitate interconnection between the components and the microprocessor.

Figure 2:
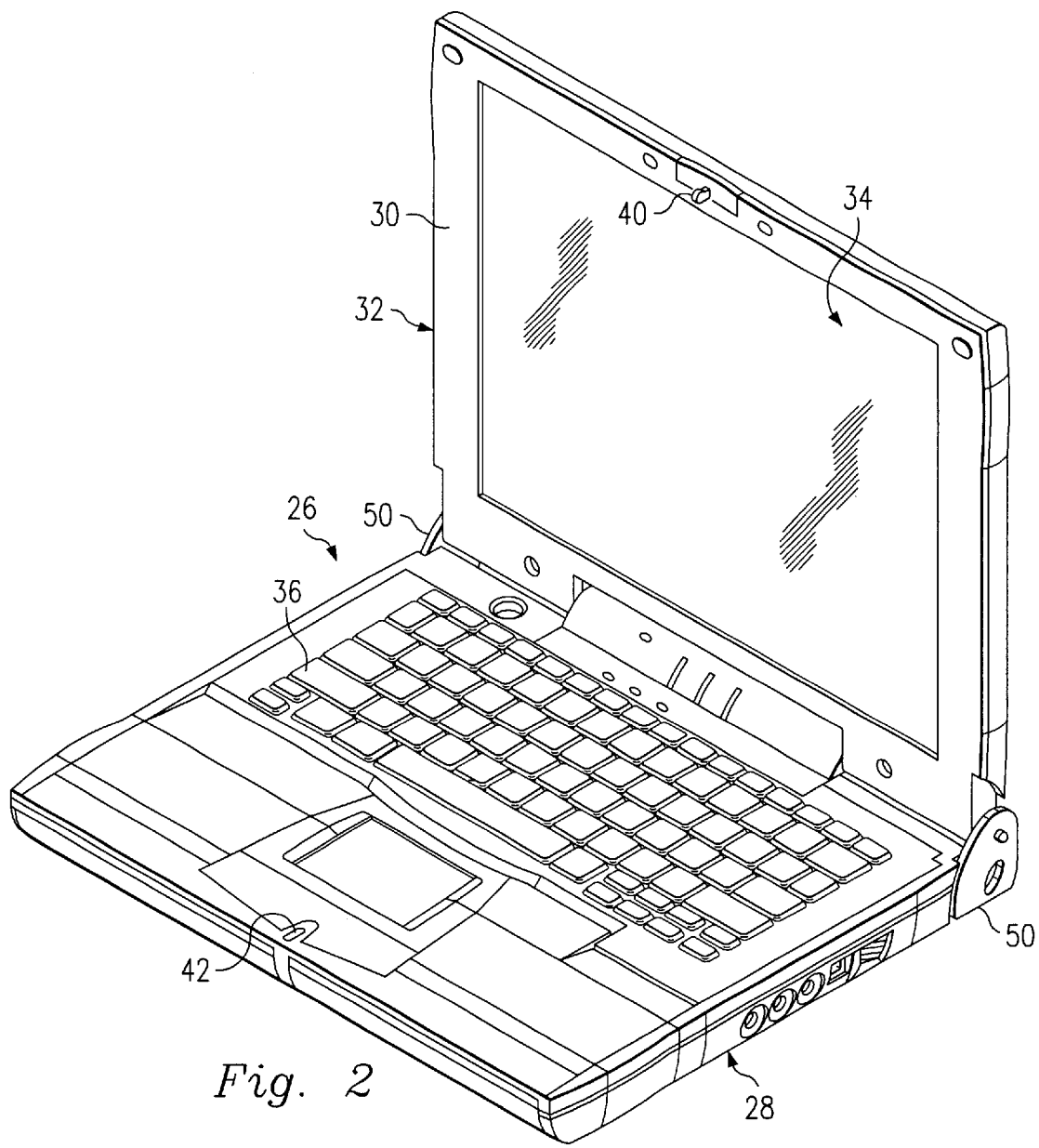
FIG. 2 is an isometric view illustrating an embodiment of a portable computer including a base, a cover, and an external hinge, with the cover in an open position.

As shown in FIG. 2, one embodiment of a portable, notebook size computer 26 comprises a self-contained system such as computer system 10, FIG. 1, and a top or cover 32 pivotally connected to a base 28 by an external hinge 50 for movement between an open position and a closed position. In the open position, a keypad 36 mounted on base 28 and an LCD panel 34, or other suitable display panel, mounted in cover 32 are exposed. Typically, cover 32 includes a bezel 30 and a latch hook 40. A latch release device 42 retains latch hook 40 to keep cover 32 engaged with base 28 when the cover 32 is in a closed position.

Figure 3:
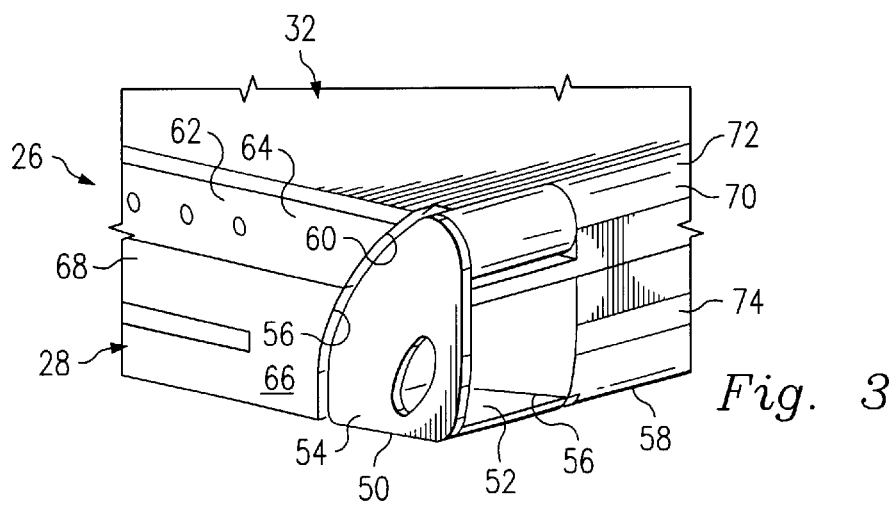
FIG. 3 is an isometric view of the portable computer of FIG. 2, illustrating an embodiment of the external hinge.
Figure 4:
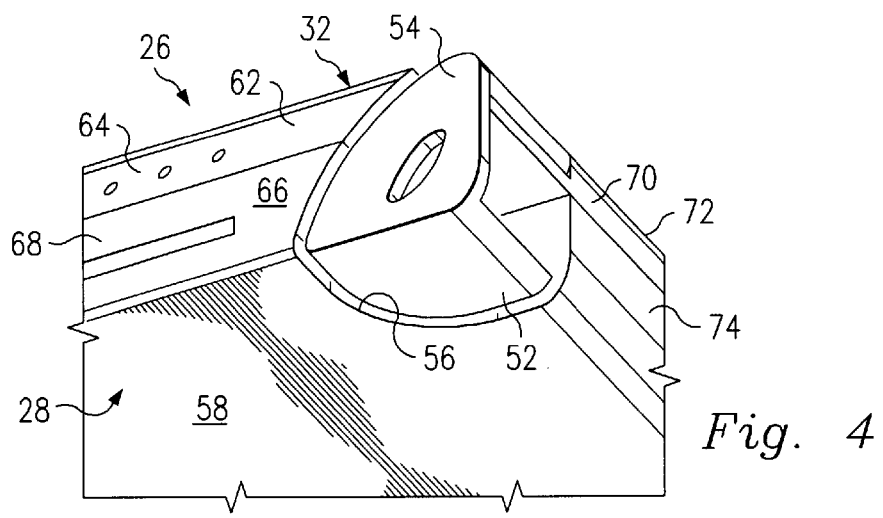
FIG. 4 is a bottom isometric view of the portable computer of FIG. 3.

FIG. 3 illustrates one embodiment of portable computer 26 with the cover 32 in the closed position. An external hinge 50 includes a first portion 52 which generally lies in a horizontal plane and a second portion 54 which lies generally in a vertical plane when portable computer 26 is in its normal operating position. First portion 52 is seated in a first hinge groove 56 formed in base 28 such that first portion 52 is substantially flush with a bottom surface 58 of base 28, as shown in FIG. 4. First portion 52 may be rigidly connected to base 28 by at least one screw or fastener, an adhesive, or by other suitable means.

Second portion 54 is seated in a second hinge groove 60 formed in cover 32 such that a part of second portion is subtantially flush with a surface 62 of a peripheral edge 64 of cover 32, as shown in FIG. 3. Second portion 54 is pivotally connected to cover 32 such that 32 may rotate between an open position and a closed position. In one embodiment, the pivotal connection between second portion 54 and cover 32 includes a clutch mechanism; however, second portion 54 may be pivotally connected to cover 32 by any other suitable means.

In the embodiment illustrated by FIGS. 3 and 4, part of second portion 54 may also be substantially flush with a surface 66 of a peripheral side 68 of base 28. In this embodiment, surface 62 of cover 32 and surface 66 of base 28 lie substantially flush when cover 32 is in the closed position. In addition, a surface 70 of a rear edge 72 of cover 32 may lie substantially flush with a rear peripheral side 74 of base 28 when cover 32 is in the closed position.

Figure 5:
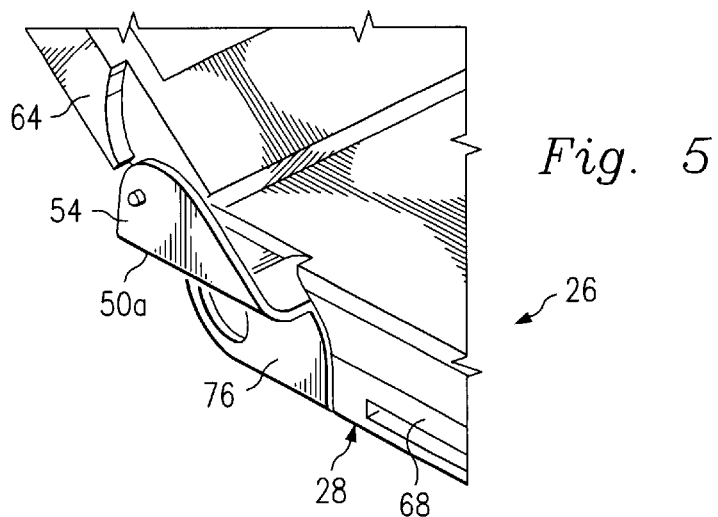
FIG. 5 is an isometric view of the portable computer of FIG. 2, illustrating another embodiment of the external hinge.
Figure 6:
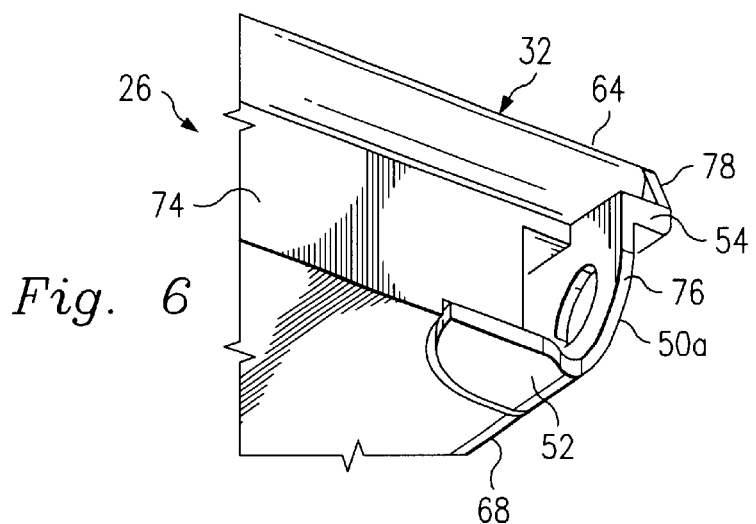
FIG. 6 is a bottom rear isometric view of the portable computer of FIG. 5.

In another embodiment of portable computer 26, as shown in FIGS. 5 and 6, external hinge 50a includes an extension portion 76 located between, and physically separating, first portion 52 and second portion 54. In this embodiment, second portion 54 includes a laterally offset portion, offset from a plane generally defined by peripheral side 68 of base 28 such that peripheral edge 64 of cover 32 overhangs peripheral side 68 when cover 32 is in the closed position, as shown in FIG. 6. Also, a rear edge 78 of second portion 54 is offset from a plane defined by rear peripheral side 74 of base 28 such that rear edge 72 overhangs rear peripheral side 74 when cover 32 is in the closed position. In another embodiment (not shown), extension portion 76 is shaped such that peripheral edge 64 overhangs peripheral side 68, but rear edge 72 is substantially flush with rear peripheral side 74, when cover 32 is in the closed position. In yet another embodiment (not shown), extension portion 76 is shaped such that rear edge 72 overhangs rear peripheral side 74, but peripheral edge 64 is substantially flush with peripheral side 68, when cover 32 is in the closed position.

As shown in FIGS. 3, 4, 5, and 6, external hinges 50 and 50a are external to both base 28 and cover 32. Thus, external hinges 50 and 50a can be easily attached to and removed from base 28 and cover 32. As shown in FIGS. 4 and 6, first hinge groove 56 in base 28 may be operable to receive a variety of external hinges, such as external hinges 50 and 50a, having different shapes, such that a variety of covers 32 having different sizes may be mounted to base 28 of a particular size. Thus, different size covers can be mounted on a particular base by using the appropriate external hinges.

External hinges 50 and 50a may be formed in one piece or may include more than one piece joined together by any suitable means. External hinges 50 and 50a may be formed of metal, plastic, or any other suitable material, may have smoothed or rounded edges and may be cosmetically appealing.

Figure 7:
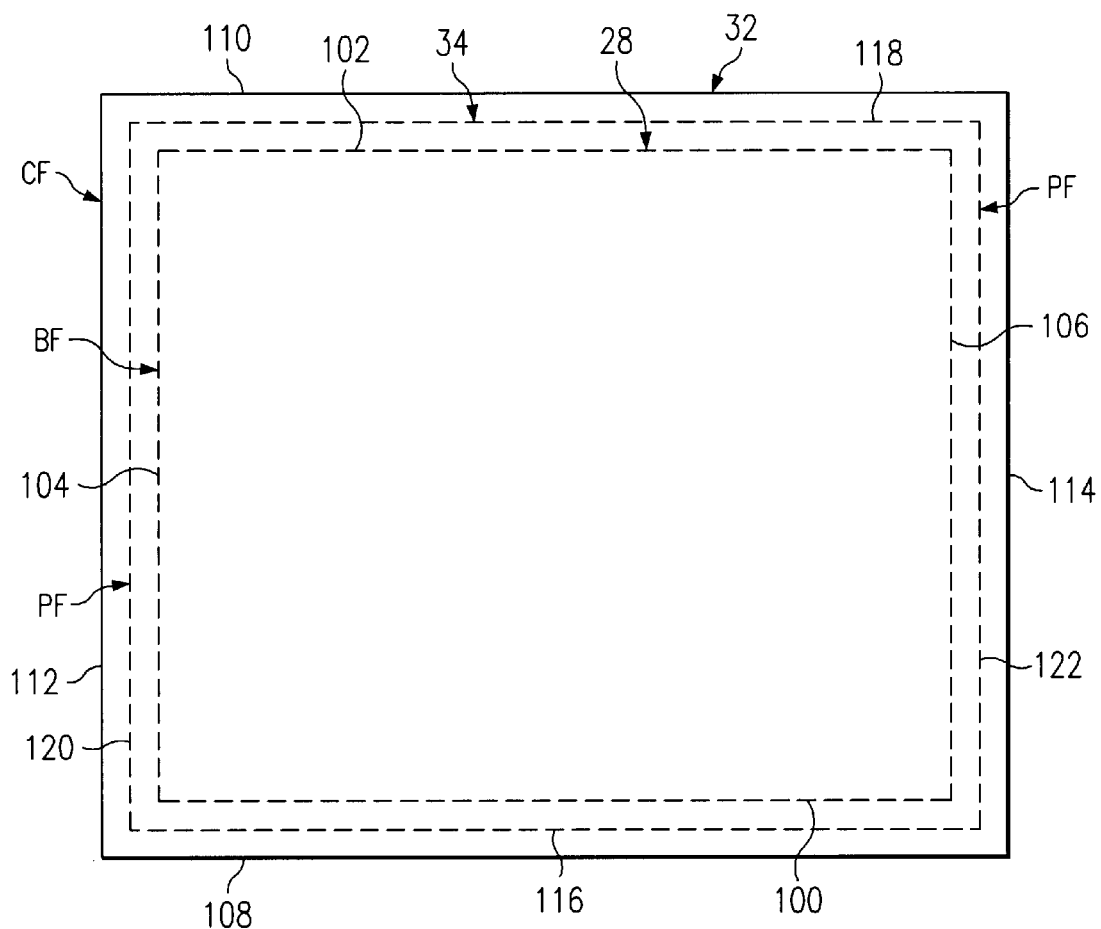
FIG. 7 is a diagrammatic view illustrating a footprint diagram of a portable computer.

Because it is an object of these embodiments to mount larger LCD panels on an existing base, the computer top 32 or LCD panel 34 may overhang edges of base 28. In one embodiment, as shown in FIG. 7, base 28 includes four peripheral sides, one of which is front side 100. Also included is a rear side 102 opposite front side 100, a left side 104 and an opposed right side 106. Similarly, cover 32 includes a front side 108, an opposite rear side 110, and a left side 112 and an opposed right side 114. LCD panel 34 also includes a front side 116, an opposite rear side 118, a left side 120, and a right side 122. Accordingly, base sides 100, 102, 104, and 106 define a base footprint designated BF. Cover sides 108, 110, 112, 114 define a cover footprint designated CF. LCD panel sides 116, 118, 120, 122 define a panel footprint designated PF. Therefore, it can be seen from FIG. 7 that the sides of the cover footprint CF overhang the sides of the base footprint BF. It can also be seen that the sides of the panel footprint PF may overhang the base footprint BF. By overhang, is meant substantially aligned with or extending beyond the peripheral limits of an associated member.

As a result, one embodiment provides a portable computer including a base and a cover mounted to the base. The base has a first hinge groove formed in an external surface of the base, and the cover has a second hinge groove formed in an external surface of the cover. The portable computer also includes a hinge having a first portion and a second portion. The first portion is seated in the first hinge groove and is substantially flush with the external surface of the base adjacent the first hinge groove. The first portion is rigidly connected to the base. The second portion is seated in the second hinge groove and is substantially flush with the external surface of the cover adjacent the second hinge groove. The second portion is pivotally connected to the cover and rigidly connected to the first portion such that the second portion is substantially perpendicular to the first portion.

Another embodiment provides a computer system including a microprocessor, an input coupled to provide input to the microprocessor, a mass storage coupled to the microprocessor, a display coupled to the microprocessor by a video controller, and a memory coupled to provide storage to facilitate execution of computer programs by the microprocessor. A portable computer includes a first hinge groove formed in an external surface of the base. A cover mounted to the base includes a second hinge groove formed in an external surface of the cover. A hinge has a first portion seated in the first hinge groove and substantially flush with the external surface of the base adjacent the first hinge groove. The first portion is rigidly connected to the base. The hinge also has a second portion seated in the second hinge groove and substantially flush with the external surface of the cover adjacent the second hinge groove. The second portion is pivotally connected to the cover and rigidly connected to the first portion such that the second portion is substantially perpendicular to the first portion.

Yet another embodiment provides a method of attaching a display panel cover to a portable computer base. A portable computer base is formed having a first hinge groove formed in an external surface thereof. A cover is formed having a second hinge groove formed in an external surface thereof. A hinge is formed having a first portion and a second portion rigidly connected, and substantially perpendicular, to the first portion. The first portion of the hinge is mounted in the first hinge groove, such that the first portion is substantially flush with the external surface of the base adjacent the first hinge groove. The second portion of the hinge is mounted in the second hinge groove and pivotally connected to the second portion to the cover, such that the second portion is substantially flush with the external surface of the cover adjacent the second hinge groove.

As it can be seen, one principal advantage of these embodiments is that in a portable computer, a variety of LCD panel covers having different sizes can be mounted to a particular portable computer base, including an LCD panel cover having a footprint which is larger than the footprint of the base. Another advantage of these embodiments is that an LCD panel cover can be easily mounted to a portable computer base, and easily interchanged with a different cover. Another advantage is that the external hinges increase the cosmetic appeal of a portable computer having a cover which overhangs sides of the base. In addition, the external hinges provide strength to the portable computer, in particular when the cover is in the open position.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A portable computer comprising:
   a base having a first hinge groove formed in at least two external surfaces thereof;
   a cover mounted on the base and having a second hinge groove formed in an external surface thereof; and
   a hinge having a first portion and a second portion seated in the first hinge groove and substantially flush with the at least two external surfaces of the base adjacent the first hinge groove, the first portion being rigidly connected to the base, and the second portion seated in the second hinge groove and substantially flush with the external surface of the cover adjacent the second hinge groove, the second portion being pivotally connected to the cover and rigidly connected to the first portion such that the second portion is substantially perpendicular to the first portion.

2. The portable computer as defined in claim 1 wherein the hinge further includes an extension portion located between the first portion and the second portion, wherein the second portion is offset from a plane defined by a peripheral side of the base in a direction away from the peripheral side, such that a peripheral edge of the cover overhangs the peripheral side of the base when the cover is in a closed position.

3. The portable computer as defined in claim 1 wherein the hinge is formed of metal.

4. The portable computer as defined in claim 1 wherein the base includes peripheral sides which define a base footprint, and wherein the cover includes peripheral sides which define a cover footprint which is larger than the base footprint.

5. The portable computer as defined in claim 1 wherein the portable computer further includes a display panel housed within the cover, wherein the base includes peripheral sides which define a base footprint, and wherein the display panel includes peripheral sides which define a panel footprint which is larger than the base footprint.

6. A portable computer comprising:
   a base having a first hinge groove formed in an external surface thereof;
   a cover mounted on the base and having a second hinge groove formed in an external surface thereof;
   a hinge having a first portion seated in the first hinge groove and substantially flush with the external surface of the base adjacent the first hinge groove, the first portion being rigidly connected to the base, and a second portion seated in the second hinge groove and substantially flush with the external surface of the cover adjacent the second hinge groove, the second portion being pivotally connected to the cover and rigidly connected to the first portion such that the second portion is substantially perpendicular to the first portion; and
   wherein the hinge further includes an extension portion located between the first portion and the second portion, wherein a rear edge of the second portion is offset from a plane defined by a rear side of the base in a direction away from the rear side, such that a rear edge of the cover overhangs the rear side of the base when the cover is in a closed position.

7. A portable computer comprising:
   a base having a first hinge groove formed in an external surface thereof;
   a cover mounted on the base and having a second hinge groove formed in an external surface thereof;
   a hinge having a first portion seated in the first hinge groove and substantially flush with the external surface of the base adjacent the first hinge groove, the first portion being rigidly connected to the base, and a second portion seated in the second hinge groove and substantially flush with the external surface of the cover adjacent the second hinge groove, the second portion being pivotally connected to the cover and rigidly connected to the first portion such that the second portion is substantially perpendicular to the first portion; and
   wherein the hinge further includes an extension portion located between the first portion and the second portion, wherein the second portion is offset from a plane defined by a peripheral side of the base in a direction away from the peripheral side, such that a peripheral edge of the cover overhangs the peripheral side of the base when the cover is in a closed position, and wherein a rear edge of the second portion is offset from a plane defined by a rear side of the base in a direction away from the rear side, such that a rear edge of the cover overhangs the rear side of the base when the cover is in a closed position.

8. A computer system comprising;

a microprocessor;

an input coupled to provide input to the microprocessor;

a mass storage coupled to the microprocessor;

a video controller coupled to the microprocessor;

a memory coupled to provide storage to facilitate execution of computer programs by the microprocessor;

a portable computer base having a first hinge groove formed in at least two external surfaces thereof;

a cover mounted on the base and having a second hinge groove formed in an external surface thereof; and a hinge having a first portion and a second portion seated in the first hinge groove and substantially flush with the at least two external surfaces of the base adjacent the first hinge groove, the first portion being rigidly connected to the base, and the second portion seated in the second hinge groove and substantially flush with the external surface of the cover adjacent the second hinge groove, the second portion being pivotally connected to the cover and rigidly connected to the first portion such that the second portion is substantially perpendicular to the first portion.

9. The portable computer as defined in claim 8 wherein the hinge further includes an extension portion located between the first portion and the second portion, wherein the second portion is offset from a plane defined by a peripheral side of the base in a direction away from the peripheral side, such that a peripheral edge of the cover overhangs the peripheral side of the base when the cover is in a closed position.

10. The portable computer as defined in claim 8 wherein the hinge is formed of metal.

11. The portable computer as defined in claim 8 wherein the base includes peripheral sides which define a base footprint, and wherein the cover includes peripheral sides which define a cover footprint which is larger than the base footprint.

12. The portable computer as defined in claim 8 wherein the portable computer further includes a display panel housed within the cover, wherein the base includes peripheral sides which define a base footprint, and wherein the display panel includes peripheral sides which define a display panel footprint which is larger than the base footprint.

13. A computer system comprising;

a microprocessor;

an input coupled to provide input to the microprocessor;

a mass storage coupled to the microprocessor;

a video controller coupled to the microprocessor;

a memory coupled to provide storage to facilitate execution of computer programs by the microprocessor;

a portable computer base having a first hinge groove formed in an external surface thereof;

a cover mounted on the base and having a second hinge groove formed in an external surface thereof;

a hinge having a first portion seated in the first hinge groove and substantially flush with the external surface of the base adjacent the first hinge groove, the first portion being rigidly connected to the base, and a second portion seated in the second hinge groove and substantially flush with the external surface of the cover adjacent the second hinge groove, the second portion being pivotally connected to the cover and rigidly connected to the first portion such that the second portion is substantially perpendicular to the first portion; and wherein the hinge further includes an extension portion located between the first portion and the second portion, wherein a rear edge of the second portion is offset from a plane defined by a rear side of the base in a direction away from the rear side, such that a rear edge of the cover overhangs the rear side when the cover is in a closed position.

14. A computer system comprising;

a microprocessor;

an input coupled to provide input to the microprocessor;

a mass storage coupled to the microprocessor;

a video controller coupled to the microprocessor;

a memory coupled to provide storage to facilitate execution of computer programs by the microprocessor;

a portable computer base having a first hinge groove formed in an external surface thereof;

a cover mounted on the base and having a second hinge groove formed in an external surface thereof;

a hinge having a first portion seated in the first hinge groove and substantially flush with the external surface of the base adjacent the first hinge groove, the first portion being rigidly connected to the base, and a second portion seated in the second hinge groove and substantially flush with the external surface of the cover adjacent the second hinge groove, the second portion being pivotally connected to the cover and rigidly connected to the first portion such that the second portion is substantially perpendicular to the first portion; and wherein the hinge further includes an extension portion located between the first portion and the second portion, wherein the second portion is offset from a plane defined by a peripheral side of the base in a direction away from the peripheral side, such that a peripheral edge of the cover overhangs the peripheral side of the base when the cover is in a closed position, and wherein a rear edge of the second portion is offset from a plane defined by a rear side of the base in a direction away from the rear side, such that a rear edge of the cover overhangs the rear side of the base when the cover is in a closed position.

15. A method of attaching a display panel cover to a portable computer base comprising the steps of:

forming a portable computer base having a first hinge groove formed in at least two external surfaces thereof;

forming a cover having a second hinge groove formed in an external surface thereof;

forming a hinge having a first portion and a second portion rigidly connected, and substantially perpendicular, to the first portion;

mounting the first portion and the second portion in the first hinge groove, wherein the first portion is substantially flush with the at least two external surfaces of the base adjacent the first hinge groove; and mounting the second portion in the second hinge groove and pivotally connecting the second portion to the cover, wherein the second portion is substantially flush with the external surface of the cover adjacent the second hinge groove.

16. The method as defined in claim 15 further comprising the step of forming an offset portion in the second portion of the hinge.

17. The method as defined in claim 15 further comprising the steps of forming an offset portion in the second portion of the hinge, and connecting the cover to the offset portion.

18. The method as defined in claim 15 further comprising the steps of forming an offset portion of the second portion of the hinge, forming the cover to overhang the base, and connecting the cover to the offset portion.

* * * * *